United States Patent
Deferme

(10) Patent No.: US 6,883,652 B2
(45) Date of Patent: Apr. 26, 2005

(54) HEAVY DUTY BASE VALVE

(75) Inventor: Stefan Deferme, Heusdem-Zolder (BE)

(73) Assignee: Tenneco Automotive Operating Company, Inc., Lake Forest, IL (US)

(*) Notice: Subject to any disclaimer, the term of this patent is extended or adjusted under 35 U.S.C. 154(b) by 0 days.

(21) Appl. No.: 10/667,913

(22) Filed: Sep. 22, 2003

(65) Prior Publication Data

US 2005/0061591 A1 Mar. 24, 2005

(51) Int. Cl.[7] .................................................. F16F 9/34
(52) U.S. Cl. ................................. 188/322.14; 188/315
(58) Field of Search ............................ 188/266.2, 266.5, 188/315, 322.14, 281, 282.4, 282.6, 284.4, 284.5, 282.8

(56) References Cited

U.S. PATENT DOCUMENTS

| 5,042,624 A | 8/1991 | Furuya et al. |
| 5,113,979 A | 5/1992 | Driessen |
| 5,115,892 A | 5/1992 | Yamaoka et al. |
| 5,150,775 A | 9/1992 | Charles et al. |
| 5,325,942 A | 7/1994 | Groves et al. |
| 5,522,486 A | 6/1996 | Fulks et al. |
| 5,630,485 A | 5/1997 | Beck |

FOREIGN PATENT DOCUMENTS

JP 06002731 A * 1/1994 ............. F16F/9/53

* cited by examiner

Primary Examiner—Xuan Lan Nguyen
(74) Attorney, Agent, or Firm—Harness, Dickey & Pierce, PLC

(57) ABSTRACT

A dual tube shock absorber has a base valve assembly which includes both low speed control using a bleed type orifice and high speed/high pressure blow off control using a disc spring. The base valve assembly provides this variable damping force characteristic while reducing the dead length of the shock absorber.

8 Claims, 4 Drawing Sheets

HEAVY DUTY BASE VALVE

FIELD OF THE INVENTION

The present invention relates generally to shock absorbers having a unique base valve assembly. More particularly, the present invention relates to a shock absorber having a base valve assembly which includes low speed control in conjunction with a blow off control which reacts to rising pressures.

BACKGROUND OF THE INVENTION

Shock absorbers are used in conjunction with automotive suspension systems and other suspension systems to absorb unwanted vibrations which occur during movement of the suspension system. In order to absorb these unwanted vibrations, automotive shock absorbers are generally connected between the sprung (body) and the unsprung (suspension/chassis) masses of the automobile.

The most common type of shock absorbers for automobiles is the dashpot type in which a piston is located within a pressure tube and is connected to the sprung mass of the vehicle through a piston rod. The piston divides the pressure tube into an upper working chamber and a lower working chamber. Because the piston, through valving, has the ability to limit the flow of damping fluid between the upper and lower working chambers within the pressure tube when the shock absorber is compressed or extended, the shock absorber is able to produce a damping force which counteracts the vibrations which would otherwise be transmitted from the unsprung mass to the sprung mass. In a dual tube shock absorber, a fluid reservoir is defined between the pressure tube and a reserve tube which is positioned around the pressure tube. A base valve is located between the lower working chamber and the fluid reservoir to also produce a damping force which counteracts the vibration which would otherwise be transmitted from the unsprung portion to the sprung portion of the automobile during stroking of the shock absorber.

Because the amount of damping forces the shock absorber generates causes variation in driving characteristics, it is often desirable to have a shock absorber in which the amount of damping forces generated by the shock absorber is variable. Various designs in the prior art have provided this variable damping force feature.

Shock absorbers which are used to provide variable damping often have a base valve which controls the flow of damping fluid between the lower working chamber and the fluid reservoir. While such base valves generally serve their intended purpose of controlling the flow of damping fluid between the fluid reservoir and the lower working chamber, they often do not adjust the flow of damping fluid in response to the desired damping characteristics which the shock absorber is to provide. In other words, the prior art base valves would typically allow approximately the same amount of damping fluid to flow between the lower working chamber and the fluid reservoir regardless of whether it was desired for the shock absorber to provide firm damping or soft damping.

SUMMARY OF THE INVENTION

The present invention provides the art with a shock absorber that includes a base valve assembly having both low speed control using an orifice and high speed/high pressure blow off type control using a disc spring. The base valve assembly provides this variable damping force characteristic while reducing the dead length of the shock absorber which is an advantage over the typical blow-off base valve which utilizes a coil spring.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
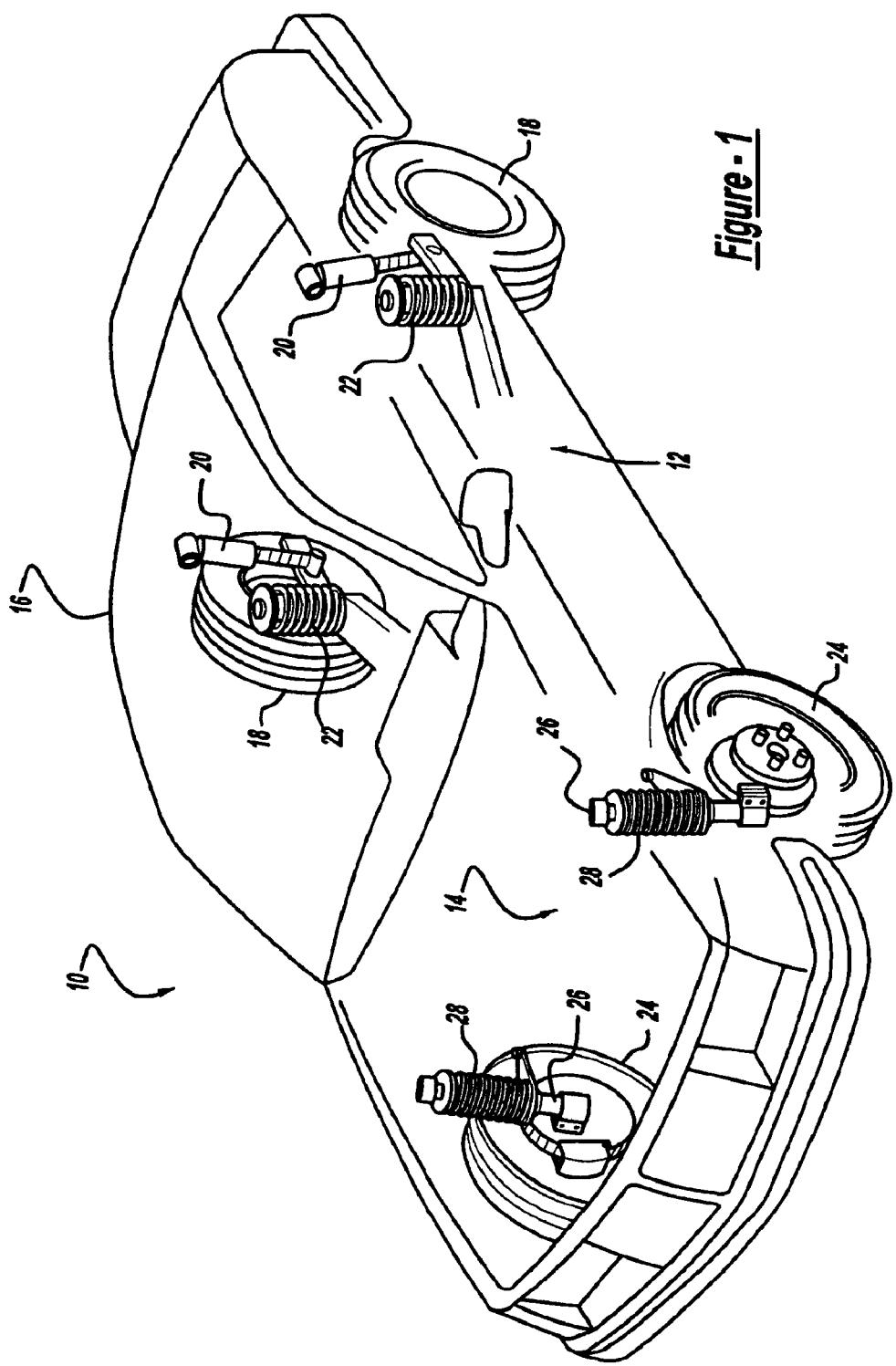
FIG. 1 is a schematic representation of a typical automobile which incorporates the unique base valve assembly in accordance with the present invention.

Referring now to the drawings in which like reference numerals designate like or corresponding parts throughout the several views; there is shown in FIG. 1 a vehicle incorporating a suspension system incorporating the shock absorbers in accordance with the present invention and which is designated generally by the reference numeral 10. Vehicle 10 includes a rear suspension 12, a front suspension 14 and a body 16. Rear suspension 12 has a transversely extending rear axle assembly (not shown) adapted to operatively support a pair of rear wheels 18 of vehicle 10. The rear axle assembly is operatively connected to body 16 by means of a pair of shock absorbers 20 and a pair of helical coil springs 22. Similarly, front suspension 14 includes a transversely extending front axle assembly (not shown) to operatively support a pair of front wheels 24 of vehicle 10. The front axle assembly is operatively connected to body 16 by means of a second pair of shock absorbers 26 and by a pair of helical coil springs 28. Shock absorbers 20 and 26 serve to dampen the relative motion of the unsprung mass (i.e., front and rear suspensions 12 and 14, respectively) and the sprung mass (i.e., body 16) of vehicle 10. While vehicle 10 has been depicted as a passenger car having front and rear axle assemblies, shock absorbers 20 and 26 may be used with other types of vehicles or in other types of applications such as vehicles incorporating independent front and/or independent rear suspension systems. Further, the term "shock absorber" as used herein is meant to refer to dampers in general and thus will include MacPherson struts.

Figure 2:
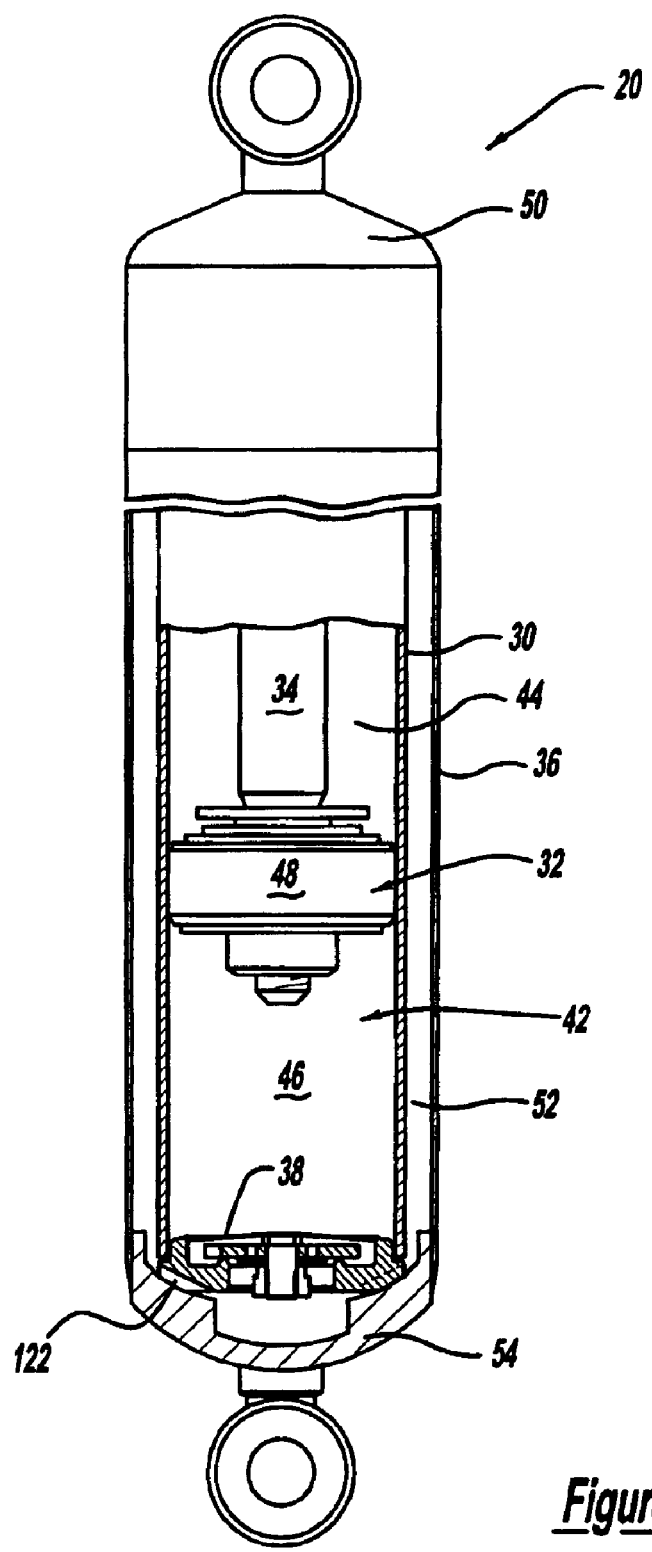
FIG. 2 is a side sectional view of the shock absorber in accordance with the present invention.

Referring now to FIG. 2, shock absorber 20 is shown in greater detail. White FIG. 2 illustrates only shock absorber 20, it is to be understood that shock absorber 26 also includes the base valve assembly described below for shock absorber 20. Shock absorber 26 only differs from shock absorber 20 in the manner in which it is adapted to be connected to the sprung and unsprung masses of vehicle 10. Shock absorber 20 comprises a pressure tube 30, a piston assembly 32, a piston rod 34, a reserve tube 36 and a base valve assembly 38.

Pressure tube 30 defines a working chamber 42. Piston assembly 32 is slidably disposed within pressure tube 30 and divides working chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through end cap 50 which closes the upper end of pressure tube 30. A sealing system seals the interface between upper end cap 50, reserve tube 36 and piston rod 34. The end of piston rod 34 opposite to piston assembly 32 is adapted to be secured to the sprung portion of vehicle 10. Valving within piston assembly 32 controls the movement of fluid between upper working chamber 44 and lower working chamber 46 during movement of piston assembly 32 within pressure tube 30. Because piston rod 34 extends only through upper working chamber 44 and not lower working chamber 46, movement of piston assembly 32 with respect to pressure tube 30 causes a difference in the amount of fluid displaced in upper working chamber 44 and the amount of fluid displaced in lower working chamber 46. The difference in the amount of fluid displaced is known as the "rod volume" and it flows through base assembly 38.

Reserve tube 36 surrounds pressure tube 30 to define a fluid reservoir chamber 52 located between tubes 30 and 36. The bottom end of reserve tube 36 is closed by an end cap 54 which is adapted to be connected to the unsprung portion of vehicle 10. The upper end of reservoir tube 36 is attached to upper end cap 50. Base valve assembly 38 is disposed between lower working chamber 46 and reservoir chamber 52 to control the flow of fluid between chambers 46 and 52. When shock absorber 20 extends in length, an additional volume of fluid is needed in lower working chamber 46 due to the "rod volume" concept. Thus, fluid will flow from reservoir chamber 52 to lower working chamber 46 through base valve assembly 38 as detailed below. When shock absorber 20 compresses in length, an excess of fluid must be removed from lower working chamber 46 due to the "rod volume" concept. Thus, fluid will flow from working chamber 46 to reservoir chamber 52 through base valve assembly 38 as detailed below.

Figure 3:
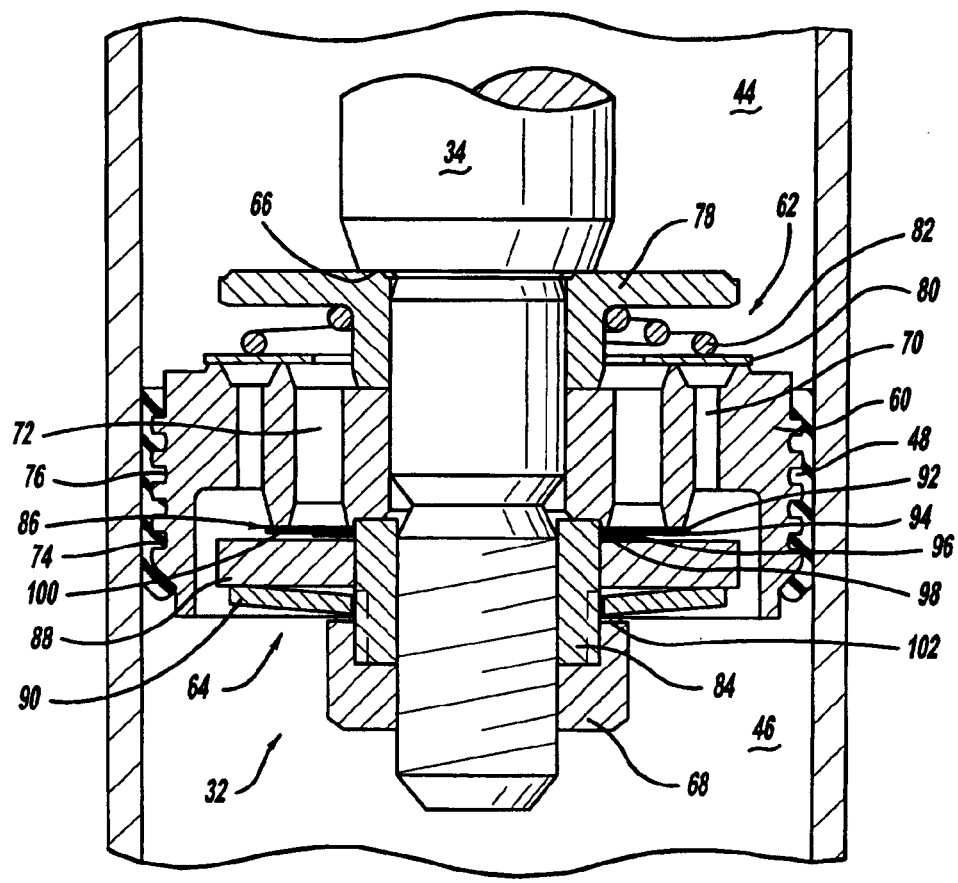
FIG. 3 is an enlarged cross-sectional view of the piston assembly in accordance with the present invention.

Referring now to FIG. 3, piston assembly 32 comprises a piston body 60, a compression valve assembly 62 and a rebound valve assembly 64. Compression valve assembly 62 is assembled against a shoulder 66 on piston rod 34. Piston body 60 is assembled against compression valve assembly 62 and rebound valve assembly 64 is assembled against piston body 60. A nut 68 secures these components to piston rod 34.

Piston body 60 defines a plurality of compression passages 70 and a plurality of rebound passages 72. Seal 48 includes a plurality of ribs 74 which mate with a plurality of annular grooves 76 to permit sliding movement of piston assembly 32.

Compression valve assembly 62 comprises a retainer 78, a valve disc 80 and a spring 82. Retainer 78 abuts shoulder 66 on one end and piston body 60 on the other end. Valve disc 80 abuts piston body 60 and closes compression passages 70 while leaving rebound passages 72 open. Spring 82 is disposed between retainer 78 and valve disc 80 to bias valve disc 80 against piston body 60. During a compression stroke, fluid in lower working chamber 46 is pressurized causing fluid pressure to react against valve disc 80. When the fluid pressure against valve disc 80 overcomes the biasing load of spring 82, valve disc 80 separates from piston body 60 to open compression passages 70 and allow fluid flow from lower working chamber to upper working chamber. Typically spring 82 only exerts a light load on valve disc 80 and compression valve assembly 62 acts like a check valve between chambers 46 and 44. The damping characteristics for shock absorber 20 are controlled by base valve assembly 38 which accommodates the flow of fluid from lower working chamber 46 to reservoir chamber 52 due to the "rod volume" concept as detailed below. During a rebound stroke, compression passages 70 are closed by valve disc 80.

Rebound valve assembly 64 comprises a spacer 84, a plurality of valve discs 86, a retainer 88 and a Belleville spring 90. Spacer 84 is threadingly received on piston rod 34 and is disposed between piston body 160 and nut 68. Spacer 84 retains piston body 60 and compression valve assembly 62 while permitting the tightening of nut 68 without compressing either valve disc 80 or valve discs 86. Retainer 78, piston body 60 and spacer 84 provide a continuous solid connection between shoulder 66 and nut 68 to facilitate the tightening and securing of nut 68 to spacer 84 and thus to piston rod 34. Valve discs 86 are slidingly received on spacer 84 and abut piston body 60 to close rebound passages 72 while leaving compression passages 70 open. Retainer 88 is also slidingly received on spacer 84 and it abuts valve discs 86. Belleville spring 90 is assembled over spacer 84 and is disposed between retainer 88 and nut 68 which is threadingly received on spacer 84. Belleville spring 90 biases retainer 88 against valve discs 86 and valve discs 86 against piston body 60. The plurality of valve discs 86 comprise a bleed disc 92, a valve disc 94, a spacer disc 96 and a fulcrum disc 98. Bleed disc 92 includes at least one slot 100 which permits a limited amount of bleed flow bypassing rebound valve assembly 64. Fulcrum disc 98 provides a fulcrum or bending point for bleed disc 92, valve disc 94 and spacer disc 96. When fluid pressure is applied to discs 92 and 94, they will elastically deflect at the outer peripheral edge of spacer disc 96 and fulcrum disc 98 to open rebound valve assembly 64. A shim 102 is located between nut 68 and Belleville spring 90 to control the preload for Belleville spring 90 and thus the blow off pressure as described below. Thus, the calibration for the blow off feature of rebound valve assembly 64 is separate from the calibration for compression valve assembly 62.

During a rebound stroke, fluid in upper working chamber 44 is pressurized causing fluid pressure to react against valve discs 86. When the fluid pressure reacting against valve discs 86 overcomes the bending load for valve discs 86, valve discs 86 elastically deflect opening rebound passages 72 allowing fluid flow from upper working chamber 44 to lower working chamber 46. The strength of valve discs 86 and the size of rebound passages will determine the damping characteristics for shock absorber 20 in rebound. Prior to the deflection of valve discs 86, a controlled amount of fluid flows from upper working chamber 44 to lower working chamber 46 through slot 100 to provide low speed tunability. When the fluid pressure within upper working chamber 44 reaches a predetermined level, the fluid pressure will overcome the biasing load of Belleville spring 90 causing axial movement of retainer 88 and the plurality of valve discs 86. The axial movement of retainer 88 and valve discs 86 fully opens rebound passages 72 thus allowing the passage of a significant amount of damping fluid creating a blowing off of the fluid pressure which is required to prevent damage to shock absorber 20 and/or vehicle 10.

Figure 4:
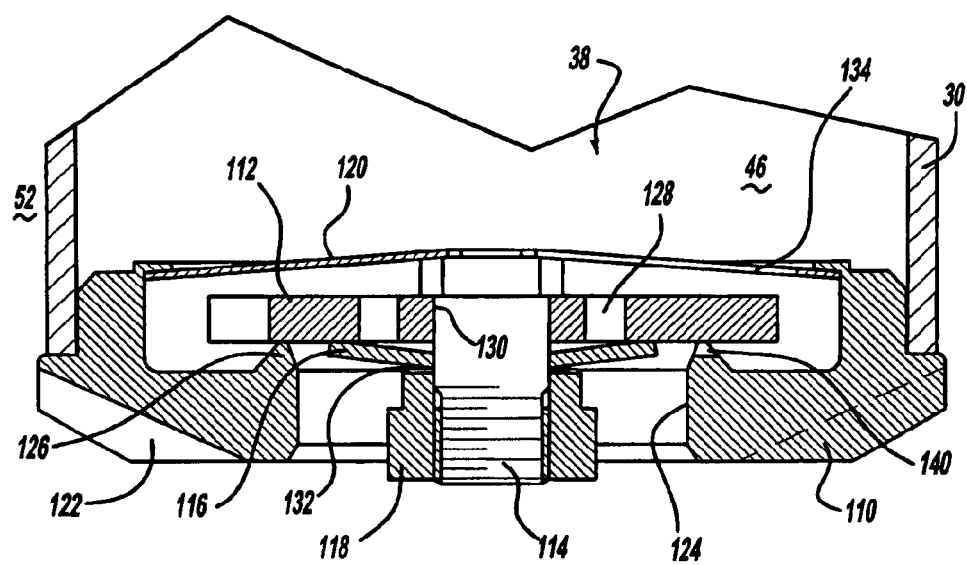
FIG. 4 is an enlarged cross-sectional view of the base valve assembly in accordance with the present invention.

Referring now to FIG. 4, base valve assembly 38 is illustrated. Base valve assembly 38 comprises a cylinder end 110, an intake valve 112, a bolt 114, a Belleville or disc spring 116, a nut 118 and an intake spring 120. Cylinder end 110 is attached to pressure tube 30 and separates lower working chamber 46 from reservoir chamber 52. Cylinder end 110 also engages reserve tube and it defines a plurality of fluid passages 122 open to reservoir chamber 52. Cylinder end 110 defines a central fluid passage 124 extending between lower working chamber 46 and reservoir chamber 52 through fluid passages 122.

Intake valve 112 is disposed within central fluid passage 124 and abuts a generally annular land 126 formed on cylinder end 110 to close central fluid passage 124. Intake valve 112 defines a plurality of compression passages 128 extending between lower working chamber 46 and reservoir chamber 52. Bolt 114 extends through a central bore 130 defined by intake valve 112 to attach Belleville spring 116 at a position adjacent intake valve 112. Nut 118 is threadingly received on bolt 114 in order to bias Belleville spring 116 against intake valve 112 to close compression passages 128. A seat disc 132 is disposed between nut 118 and Belleville spring 116 to provide a surface against which Belleville spring 116 reacts.

Intake spring 120 is disposed between intake valve 112 and bolt 114 to bias intake valve 112 against annular land 126 to close central fluid passage 124. Intake spring 120 defines a plurality of apertures 134 extending through intake spring 120 to allow fluid within lower working chamber 46 to flow into compression passages 128.

During a rebound stroke of shock absorber 20, fluid flows through rebound valve assembly 64 of piston assembly 32 as described above. Due to the "rod volume" concept described above, fluid is required to flow from reservoir chamber 52 to lower working chamber 46 through base valve assembly 38. The pressure differential between lower working chamber 46 and reservoir chamber 52 deflects intake spring 120 to move intake valve 112 away from annular land 126 to open central fluid passage 124 to allow fluid flow from reservoir chamber 52 into lower working chamber 46. Intake spring 120: is designed to exert a minimum load against bolt 114 such that base valve assembly 38 acts like a check valve during a rebound stroke. The damping load during a rebound stroke is primarily controlled by rebound valve assembly 64 of piston assembly 32.

During a compression stroke of shock absorber 20, a minimal amount of damping load is generated by compression valve assembly 62 of piston assembly 32. The majority of damping force created by shock absorber 20 during a compression stroke of shock absorber 20 is generated by base valve assembly 38. Due to the "rod volume" concept, fluid needs to flow from lower working chamber 46 to reservoir chamber 52 through base valve assembly 38. During the compression stroke of shock absorber 20, fluid in lower working chamber 46 is pressurized and fluid flows from lower working chamber 46 through a bleed orifice 140 formed in annular land 126 or intake valve 112. As the pressure within lower working chamber 46 increases, the fluid pressure reacts against Belleville spring 116 through compression passages 128. When the fluid pressure within lower working chamber reaches a predetermined value, the fluid pressure will overcome the biasing load of Belleville spring 116 causing deflection of Belleville spring 116 allowing the passage of fluid through compression passage 128 creating a blow off of the fluid pressure within lower working chamber 46.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A shock absorber comprising:

a pressure tube forming a working chamber;

a piston body slidably disposed within said working chamber, said piston body dividing said working chamber into an upper working chamber and a lower working chamber;

a piston rod attached to said piston body, said piston rod extending through one end of said pressure tube;

a reserve tube surrounding said pressure tube to form a reservoir chamber between said reserve tube and said pressure tube;

a base valve assembly disposed between said working chamber and said reserve chamber, said base valve assembly comprising:

a cylinder end disposed between said pressure tube and said reserve tube, said cylinder end defining a central fluid passage;

an intake valve directly engaging said cylinder end to close said central fluid passage, said intake valve defining a plurality of compression passages; and a disc spring having an outer circumferential edge biased against only said intake valve to close said plurality of compression passages.

2. The shock absorber according to claim 1, further comprising an intake spring biasing said intake valve against said cylinder end.

3. The shock absorber according to claim 1, wherein said cylinder end defines an annular land, said intake valve engaging said land to close said central fluid passage.

4. The shock absorber according to claim 3, wherein said annular land defines a bleed orifice.

5. The shock absorber according to claim 1, further comprising a bolt extending through said intake valve and a nut threadingly received by said bolt, said disc spring being disposed between said nut and said intake valve.

6. The shock absorber according to claim 5, further comprising an intake spring disposed between said bolt and said cylinder end, said intake spring biasing said intake valve against said cylinder end.

7. The shock absorber according to claim 6, wherein said cylinder end defines an annular land, said intake valve engaging said annular land to close said central fluid passage.

8. The shock absorber according to claim 7, wherein said annular land defines a bleed orifice.

* * * * *